E. C. CHEEK.
MITER BOX.
No. 66,217. Patented July 2, 1867.
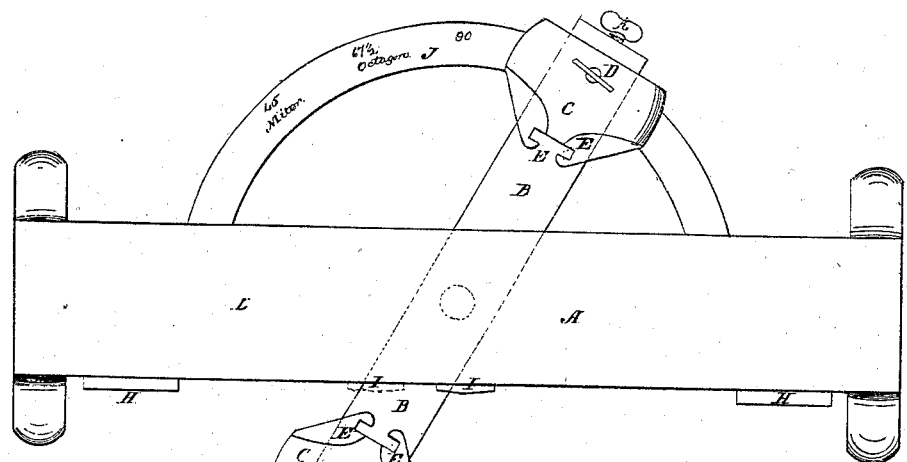
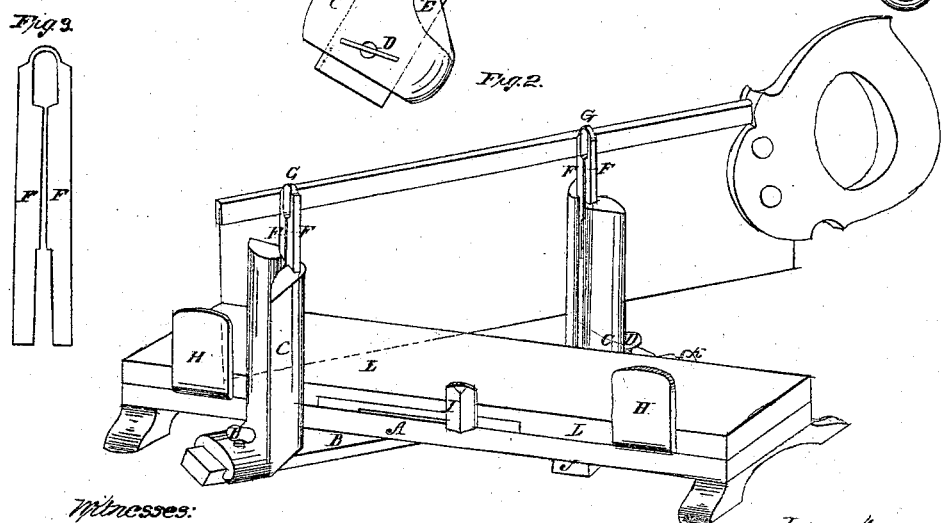

United States Patent Office.

E. C. CHEEK, OF PLACERVILLE, CALIFORNIA.

Letters Patent No. 66,217, dated July 2, 1867.

IMPROVEMENT IN MITRE-BOXES.

*The Schedule referred to in these Letters Patent and making part of the same.*

TO ALL WHOM IT MAY CONCERN:

Be it known that I, E. C. CHEEK, of Placerville, in the county of Eldorado, and State of California, have invented a new and useful Improvement in Adjustable Mitre-Boxes; and I do hereby declare the following to be a full, clear, and exact description of the same, reference being had to the accompanying drawings, in which—

Figure 1 is a plan view of my invention.
Figure 2 is a perspective view of the same.
Figure 3 is an elevation of one of the saw-guides.

My invention consists in the cheap and efficient construction of a mitre-box which may be set at any desired angle with the utmost facility, and will guide the saw with precision, and will possess great durability. That others may understand the construction and operation of my invention I will particularly describe it.

The metallic bed-frame A has pivoted to its under side a cross-bar, B. The saw-guide blocks C are placed upon the bar B, and are so fitted as to slide back and forth thereon, and are provided with set-screws D D, by which they may be "set" at any desired point. The block C is a slotted block having a foot turned at right angles to the axis of the block. This foot is fitted to the bar B, having its edges turned over the dove-tailed edges of said bar, and thus enabled to be securely attached to the bar, while it may also be caused to slide along its surface. In each side of the slot of the block C is a guide-way or channel, E, in which the saw-guides move during the operation of cutting the mitre. The saw-guide consists of two bars, F F, of suitable width and thickness to fit neatly within the guide-ways E, and when placed in said guide-ways to leave space between them for the saw-blade. They are notched at their upper and at their lower ends, as shown, for the purpose of accommodating, in the first place, the "back" of an ordinary backed saw, and in the second place to permit the teeth of the saw to pass between the saw-guides without touching. For convenience I connect the bars F F at their upper ends by a spring, as at G, which not only renders them more convenient in use, by keeping the two guides in the same relative position, but by keeping them always in contact with the sides of the guide-ways, all unpleasant rattling is avoided. The stops H H are fixed to the bed-frame A, and serve to rest the work against during the operation of the saw. The movable stop I slides in a slot, and may be moved back and forth to bring it on either side of the saw-cut desired, to support the work. The bar B, which carries the guide-blocks C, being pivoted to the bed-frame, it is evident that the saw-guides may be moved so that a line connecting them will describe, within their limit of movement, any desired angle to a line which touches the stops H H, and if a piece of moulding or other work be placed upon the bed A, and in contact with the stops H H, a saw passing between the saw-guides F F may be made to cut said moulding at any desired angle. In addition to this capacity it is necessary to provide means by which the saw-guides may be readily brought to the desired position, but may be retained there during the pleasure of the operator. I therefore provide the graduated arc J, over which one end of the bar B travels, and to which the said bar may be secured at any desired point by the set-screw K. If desired a small spring click may be attached to the bar B to catch in the notches of the graduations to indicate more readily when the desired point has been reached. Or, if considered more desirable or convenient, when the bar B is in the desired position, one or both of the guide-blocks C may be moved up until it comes in contact with the edge of the bed-plate A. This contact will indicate when the bar has been moved far enough, and will be found convenient when the operator is engaged in cutting out work, as picture-frames, where it is necessary to reverse the angle frequently. That there may be no danger of injuring the saw-teeth by cutting against the metallic bed A, when the work is cut through, a piece of wood, L, is laid upon said bed, and secured there by any convenient means. It should be dressed to a thickness so that the saw-cut will be at right angles to its surface. When this wooden bed becomes worn out another is put in its place, which is done without difficulty as none of the working parts of the apparatus are interfered with or disturbed thereby.

In operation the bar B should be placed at the desired angle first. The work may be laid upon the bed against the stops H H I, the latter of which is brought to that side of the saw-cut where it will support the "work" after the waste is cut off, a point of great importance, for if the work be not firmly supported throughout, it might slip at the last moment and be spoiled. The saw is then passed between the guides F F, and the operation of cutting may commence, the guides F F gradually sinking in their ways as the saw penetrates the work, and keeping it always in line and perpendicular to the bed.

Having described my invention, what I claim as new, and desire to secure by Letters Patent, is—

1. An adjustable mitre-box composed of a bed or frame, A, to which are secured the swinging arm B, the permanent stops H H, and the movable stop I, all constructed and operating substantially as described and for the purpose set forth.

2. The movable stop I, to hold the work close to the saw-cut, and on either side of the same, and operating substantially as set forth.

E. C. CHELK.

Witnesses:
R. D. O. SMITH,
JOHN S. HOLLINGSHEAD.